United States Patent
Kreitzer et al.

(10) Patent No.: US 7,966,606 B2
(45) Date of Patent: Jun. 21, 2011

(54) METHODS AND APPARATUS FOR GENERATING BRANCHLESS CODE FOR SELECT STATEMENTS

(75) Inventors: David Kreitzer, Bristow, VA (US); Mitchell Bodart, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 957 days.

(21) Appl. No.: 11/899,520

(22) Filed: Sep. 6, 2007

(65) Prior Publication Data
US 2009/0070751 A1 Mar. 12, 2009

(51) Int. Cl.
*G06F 9/45* (2006.01)
(52) U.S. Cl. ........ 717/141
(58) Field of Classification Search ........ 717/141
See application file for complete search history.

(56) References Cited

U.S. PATENT DOCUMENTS

| 5,790,866 A | * | 8/1998 | Robison | 717/160 |
| 7,818,361 B1 | * | 10/2010 | Pugh | 708/625 |
| 2003/0028864 A1 | * | 2/2003 | Bowen | 717/141 |

OTHER PUBLICATIONS

Intel®, "Intel® 64 and IA-32 Architectures Software Developer's Manual, vol. 2A: Instruction Set Reference, A-M," May 2007, pp. 3-116 to 3-122.
Intel®, "Intel® 64 and IA-32 Architectures Software Developer's Manual, vol. 2B: Instruction Set Reference, N-Z," May 2007, pp. 4-287 to 4-290.
Intel®, "Intel® 64 and IA-32 Architectures Software Developer's Manual, vol. 2B: Instruction Set Reference, N-Z," May 2007, pp. 4-296 to 4-300.

* cited by examiner

*Primary Examiner* — Philip Wang
(74) *Attorney, Agent, or Firm* — Trop, Pruner & Hu, P.C.

(57) ABSTRACT

In one embodiment, the present invention includes a method for determining whether a select statement can be transformed, and if so selecting a first or second transformation operation based on compiler-evaluated values for certain variables of the select statement, performing the selected transformation operation to obtain at least one new statement, and replacing the select statement with the at least one new statement. Other embodiments are described and claimed.

12 Claims, 2 Drawing Sheets

METHODS AND APPARATUS FOR GENERATING BRANCHLESS CODE FOR SELECT STATEMENTS

BACKGROUND

Various techniques exist in the literature and in compilers to aggressively eliminate branches. Predication (e.g., conditional moves), idiom recognition (e.g., min, max, abs), and branch folding are just a few examples. Existing compilers use alternate methods of generating branchless code for some integer select operations. One method involves using a so-called conditional move (CMOV) instruction to perform a select operation if a predetermined condition has occurred. In this way, a branch such as a jump instruction can be avoided. Some compilers use predication, which is similar in some ways to a CMOV instruction. Other methods utilize so-called set on condition (SETcc) or subtract integer with borrow (SBB) instructions. However, these methods can be time consuming and produce code that can be inefficient.

DETAILED DESCRIPTION

In various embodiments, compiler code generation may be optimized for some integer select statements. In this way, branches, which may cause performance degradations due to misprediction penalties, may be avoided. Embodiments may include a recognition algorithm that detects optimization opportunities and a transformation algorithm that transforms optimizable selects into equivalent linear code sequences.

While the scope of the present invention is not limited in this regard, some implementations may be performed in a compiler such as a C, C++, Fortran or other such compiler. Furthermore, while the transformation operations disclosed herein may be applicable to various select operations, in some embodiments the select operation may be an integer select operation such as a ternary operation in which one of two values is chosen based on a relational expression involving a first operation and a second value. In one embodiment, the ternary operation may correspond to the following: ((x & A) cond B) ? C : D, where A, C, and D are compile-time constants, i.e., their runtime values can be deduced at compile time. B may either be a compile-time constant or a variable, provided it adheres to the rules set forth below. As set forth, this ternary operation may perform a bitwise-AND operation between x and A and then perform a comparison with B. Based on whether the relational expression is true or false, either a value of C or D is selected. Specifically, if the conditional value is true, C is selected, otherwise D is selected.

Figure 1:
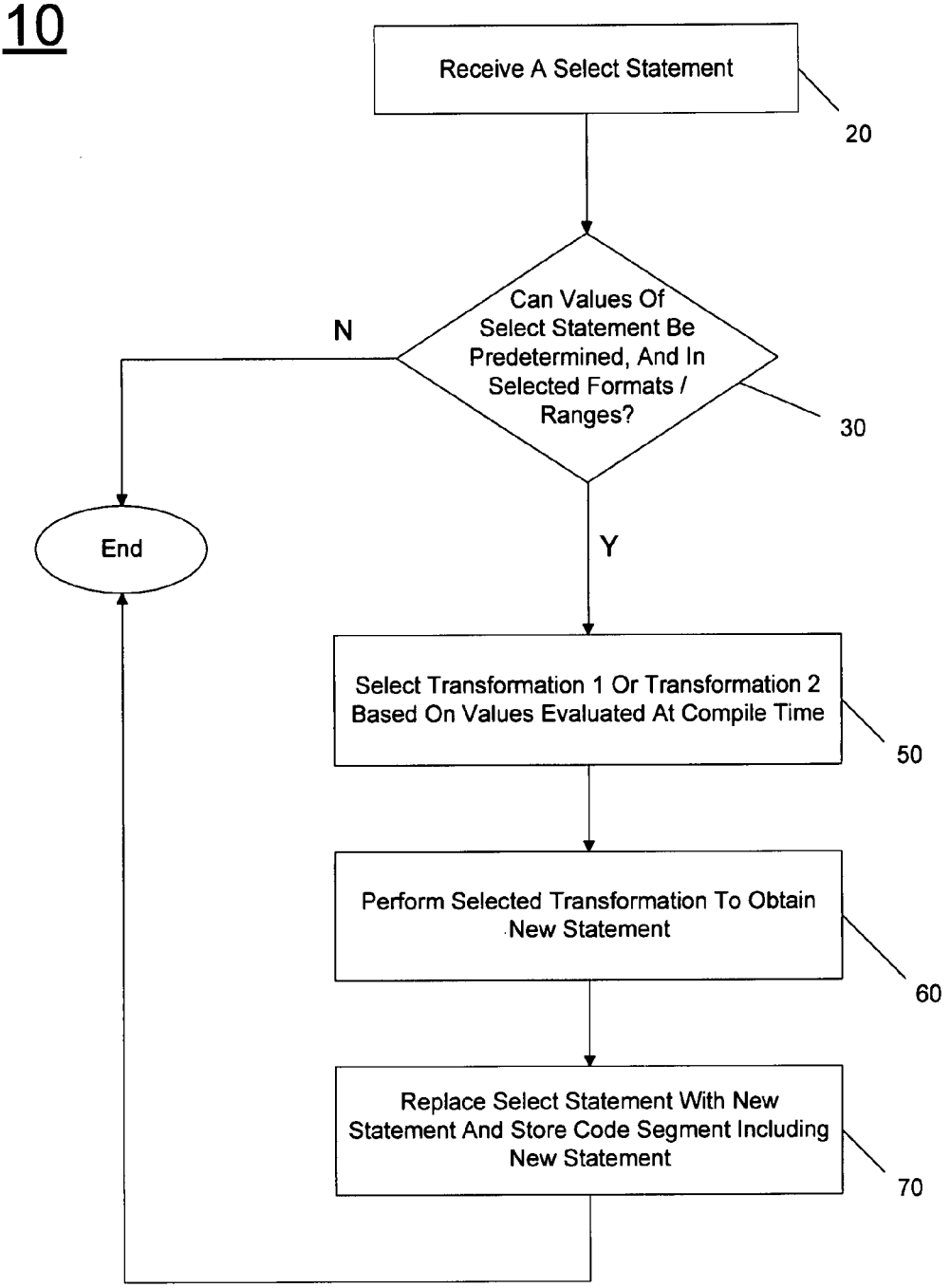
FIG. 1 is a flow diagram of a method in accordance with one embodiment of the present invention.

Referring now to FIG. 1, shown is a flow diagram of a method in accordance with one embodiment of the present invention. As shown in FIG. 1, method 10 may be performed by a compiler in accordance with an embodiment of the present invention. As shown in FIG. 1, method 10 may begin by receiving a select statement, i.e., including an integer select statement (block 20). Such a select statement may be present in a source code segment received by a compiler. Based on the received select statement, it may be determined whether one or more values of the statement can be predetermined at compile-time, and at least one of which is of a select format (diamond 30). Thus the method may determine that the received select statement is one for which a transformation in accordance with an embodiment of the present invention is available. While not limited in this regard, it may be determined, in the above ternary operation, whether A, C, and D are compile-time constants and A is a single-bit value. Further, as will be described below, B may be compile-time evaluated to be in a predetermined range of values. If these formats are not present, an optimization in accordance with the embodiment of the present invention cannot be performed and method 10 concludes.

If transformation is possible, control passes to block 50 where one of multiple transformations may be selected based on selected values evaluated at compile time. For example, in some implementations two different transformations may be realized, each with different variances depending on the values present in the select statement. Next, the selected transformation may be performed to obtain a new statement (block 60). For example, one or more optimized code statements may be generated to replace the integer select statement. In this way, a select statement which may cause branching in the code may be replaced with efficient, branchless code. Finally, at block 70, the select statement may be replaced with the new code. Upon completion of compilation, a compiled program may result which, when executed results in more efficient operation due to replacement of the select statement with one or more transformed expressions. Of course, prior to such execution the compiled code may be stored in a desired location, such as a code cache or other such storage. While shown with this particular implementation in the embodiment of FIG. 1, the scope of the present invention is not limited in this regard.

In one embodiment, the goal of the optimization is to perform one of the following transformations:

Transformation 1
((x&A) cond B) ? C : D → ((x & A) shift_op shift_count)+ offset; or Transformation 2
((x & A) cond B) ? C : D →(val shift2_op ((x & A) shift1_op shift1_count))+offset.

In both of these transformations, shift_op may correspond to a given shift operation (e.g., a left or right shift), while shift_count corresponds to a number of bits of the shift, and offset corresponds to a predetermined offset value.

In either case, A must be a single-bit compile time constant. The idea is that when A is a single-bit constant, the expression (x & A) produces one of two possible values, A and 0. Depending on the values of B, C, and D, and the condition cond, the compiler may be able to adjust the result of (x & A) to produce exactly C or D instead of A or 0.

Referring now to Tables 1 and 2, shown are transformation examples for Transformation 1 or Transformation 2, respectively, in accordance with an embodiment of the present invention.

TABLE 1

| (1) | ((x & 64) != 0) ? 64:0 | → | (x & 64) |
| (2) | ((x & 64) != 0) ? 8:0 | → | (x & 64) >> 3 |
| (3) | ((x & 64) != 0) ? 10:2 | → | ((x & 64) >> 3) + 2 |
| (4) | ((x & 64) == 0) ? 10:2 | → | ((~x & 64) >> 3) + 2 |

TABLE 2

| (5) | ((x & 2) != 0) ? 16:4 | → | 4 << (x & 2) |
| (6) | ((x & 2) != 0) ? 64:4 | → | 4 << ((x & 2) << 1) |
| (7) | ((x & 2) != 0) ? 66:6 | → | (4 << ((x & 2) << 1)) + 2 |

Thus in various embodiments, optimizable selects take the form of ((x & A) cond B) ? C : D, where all values have integral types. As previously stated, A is a single-bit compile time constant, and cond may be any condition, such as less than, less than or equal to, equal, not equal, greater than or equal, or greater than conditions (<, <=, ==, !=, >=, >). B may either be a compile-time constant or a variable, provided that the relational expressions (0 cond B) and (A cond B) can be predetermined. For example, if B is a variable known to be in the range 0<=B<A and cond is <=, then (0 cond B) can be predetermined to be True and (A cond B) can be predetermined to be False. With some values of A, B, and cond, the entire expression ((x & A) cond B) may be computable at compile time. These cases can be optimized with constant folding techniques to replace the select with either C or D. So for the rest of the discussion, assume that ((x & A) cond B) may produce either True or False, depending on the value of x. In other words, the relational expression (0 cond B) may evaluate to a different value than (A cond B).

In one embodiment, an optimizable select recognition algorithm analyzes the values of C and D to determine whether either Transformation 1 or Transformation 2 is possible. Transformation 1 is possible if either (C−D) or (D−C) is a single bit constant. Transformation 2 is possible if either (C−D) or (D−C) is the difference between any two single bit constants whose bit positions differ by a power of two. That is, we must be able to choose exponents n and m such that:

$$X=2^n, Y=2^m, n-m \text{ is a power of two and } (X-Y)==(C-D) \text{ or } (D-C) \quad [\text{Eq. 1}]$$

It is not difficult to detect this case if you observe that X−Y will be a binary number that consists of exactly one string of consecutive ones. That is, $$X-Y=2^m+2^{m+1}+2^{m+2}\ldots+2^{n-2}+2^{n-1} \quad [\text{Eq. 2}]$$

As stated above, Transformation 1 is possible if either (C−D) or (D−C) is a single bit constant. We will derive the transformation algorithm assuming that (C−D) is the single bit constant, and we will call this constant X. Since A is a single bit constant, the expression (x & A) produces either A or 0. Since X is also a single bit constant, we can choose a shift_op and shift_count such that ((x & A) shift_op shift_count) produces either X or 0. Adding D to the result produces either C or D. The derivation for Transformation 1 is summarized in Table 3.

TABLE 3

| Expression | Possible Results {True Result, False Result} |
|---|---|
| (x & A) | {A, 0} |
| (x & A) shift_op shift_count | {X, 0} |
| ((x & A) shift_op shift_count) + D | {X + D, D} == {C, D} |

This derivation also assumes that when (x & A) is non-zero, ((x & A) cond B) is True. But it is possible that the opposite is True, e.g. (x & 64) !=64. In that case, we need to invert the result of (x & A), which can be accomplished by computing (~x & A), where "~" is the ones complement operator. Alternatively, the inversion could be performed using an exclusive-OR (XOR) operation with A or a similar technique.

As stated above, Transformation 2 is possible if either (C−D) or (D−C) is the difference between any two single bit constants whose bit positions differ by a power of two. We will derive the transformation algorithm assuming that (C−D) fits this rule. We must first compute X and Y as above.

Eq. 3 follows from Eq. 2, and Eq. 4 follows from Eq. 1.

$$Y=2^m \text{ calculated using (Least significant set bit}(C-D)) \quad [\text{Eq. 3}]$$

$$X=(C-D)+Y \quad [\text{Eq. 4}]$$

Since X and Y are single bit constants, we can choose a shift2_op and shift2_count such that Y shift2_op shift2_count==X. And since we have checked that n and m differ by a power of two, we know that shift2_count is a power of two. Therefore, we can choose a shift1_op and shift1_count such that A shift1_op shift1_count==shift2_count. The derivation of Transformation 2 is summarized in the following table.

TABLE 4

| Expression | Possible Results {True Result, False Result} |
|---|---|
| (x & A) | {A, 0} |
| (x & A) shift1_op shift1_count | {shift2_count, 0} |
| Y shift2_op ((x & A) shift1_op shift1_count) | {X, Y} |
| (Y shift2_op ((x & A) shift1_op shift1_count)) + (C − X) | {C, Y + C − X} == {C, D} |

Note that Transformation 2 does not require extra code to invert (x & A), as X can be used instead of Y and shift2_op reversed in the final expression.

Table 5 gives pseudo code for recognition and transformation algorithms in accordance with one embodiment of the present invention. The code is simplified by abstracting several functions out of the algorithm. For example, the invert function detects whether to use the direct or inverted form of each transformation. Its computation is a straightforward function of the inputs and is not detailed here. Also, the figure only detects transformations involving (C−D), not (D−C). An embodiment to support (D−C) can be extended from this code.

TABLE 5

```
int compute_transformation_to_use
{
    if (!power_of_two(A) || !constant(B) || !constant(C) || !constant(D))
        return 0;
    if (power_of_two(C − D)) return 1; /* Transformation 1 */
    if (is_string_of_1s(C − D)) {
        Y = least_significant_bit(C − D);
        X = C − D + Y;
        if (is_power_of_two(log2(X) − log2(Y))) return 2;
        /* Transformation 2 */
    }
    return 0; /* No transformation possible */
}
do_transformation1
{
    X = C − D;
    shift_op = (X > A) ? shift_left : shift_right;
    shift_count = abs(log2(X) − log2(A));
    if (invert(A, B, cond, C, D))
        new_expression = ((~x & A) shift_op shift2_count) + D;
    else
        new_expression = ((x & A) shift_op shift2_count) + D;
}
do_transformation2
{
    Y = least_significant_set_bit(C − D);
    X = (C − D) + Y;
    shift2_op = shift_left;
    shift2_count = log2(X) − log2(Y);
    shift1_op = (shift2_count > A) ? shift_left : shift_right;
    shift1_count = abs(log2(shift2_count) − log2(A));
    if (invert(A, B, cond, C, D)) {
```

TABLE 5-continued

```
    shift2_op = reverse_shift_op(shift2_op);
    new_expression =
        (X shift2_op ((x & A) shift1_op shift1_count)) + (C − X);
}
else
    new_expression =
        (Y shift2_op ((x & A) shift1_op shift1_count)) + (C − X);
}
```

Linear code implementations of select operations as provided with an embodiment of the present invention provide a clear performance benefit over implementations that use branches, and that benefit may be most pronounced when the branch is poorly predicted. Compared to other branchless implementations, the code generated by the transformations described herein may be faster on some microprocessors, because all instructions are of single cycle latency.

Figure 2:
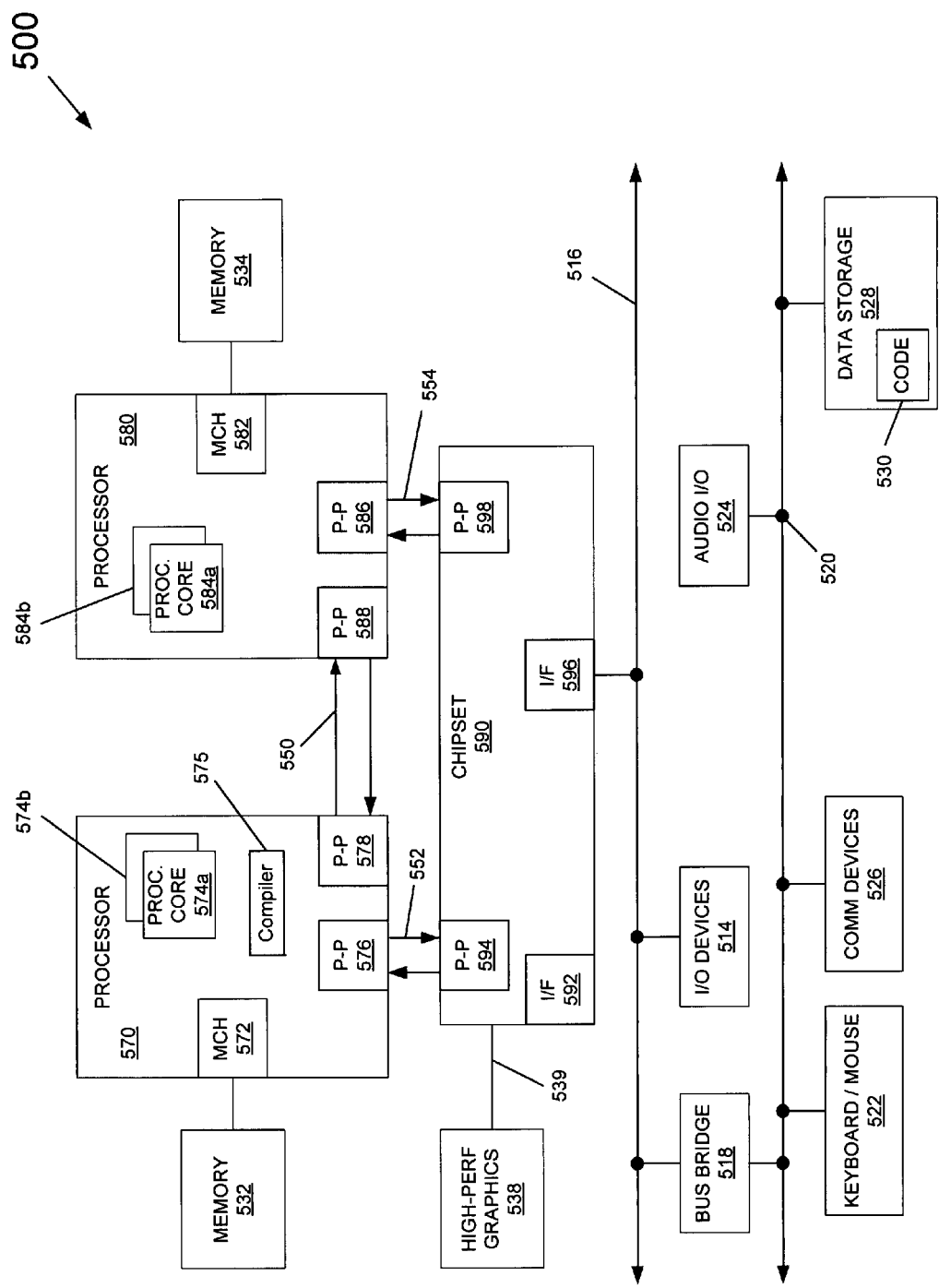
FIG. 2 is a block diagram of a multiprocessor system in accordance with an embodiment of the present invention.

Embodiments may be suited for many different types of platforms. Referring now to FIG. 2, shown is a block diagram of a multiprocessor system in accordance with an embodiment of the present invention. As shown in FIG. 2, multiprocessor system 500 is a point-to-point interconnect system, and includes a first processor 570 and a second processor 580 coupled via a point-to-point interconnect 550. However, in other embodiments the multiprocessor system may be of another bus architecture, such as a multi-drop bus or another such implementation. As shown in FIG. 2, each of processors 570 and 580 may be multi-core processors including first and second processor cores (i.e., processor cores 574a and 574b and processor cores 584a and 584b), although other cores and potentially many more other cores may be present in particular embodiments. Furthermore, as shown in FIG. 2 at least one of the processors may execute a compiler 575 which can optimize certain select statements in accordance with an embodiment of the present invention to generate branchless code, which can then be stored and executed on either processor.

Still referring to FIG. 2, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 2, MCH's 572 and 582 couple the processors to respective memories, namely a memory 532 and a memory 534, which may be portions of main memory (e.g., a dynamic random access memory (DRAM)) locally attached to the respective processors.

First processor 570 and second processor 580 may be coupled to a chipset 590 via P-P interconnects 552 and 554, respectively. As shown in FIG. 2, chipset 590 includes P-P interfaces 594 and 598. Furthermore, chipset 590 includes an interface 592 to couple chipset 590 with a high performance graphics engine 538 via a bus 539.

As shown in FIG. 2, various I/O devices 514 may be coupled to first bus 516, along with a bus bridge 518 which couples first bus 516 to a second bus 520. In one embodiment, second bus 520 may be a low pin count (LPC) bus. Various devices may be coupled to second bus 520 including, for example, a keyboard/mouse 522, communication devices 526 and a data storage unit 528 which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
receiving a select statement of a code segment in a compiler that executes on a processor, wherein the select statement corresponds to ((x & A) cond B) ? C : D;
determining whether a plurality of compile-time constants are present in the select statement and a selected one of the plurality of compile-time constants is a single-bit value, and whether a pair of relational expressions including a value present in the select statement can be predetermined, including determining that the select statement can be transformed if A is a single bit constant, x is an integer, and C−D is a power of two, or that C−D is a string of logical one values and a first compile-time value (Y) is equal to a least significant bit of C−D and a second compile-time value (X) is equal to C−D+Y and that $\log_2 X - \log_2 Y$ is a power of two, and otherwise determining that the select statement cannot be transformed;
if the select statement can be transformed, selecting a first transformation or a second transformation based on compile-time evaluated values of at least some of the plurality of compile-time constants of the select statement;
performing the selected transformation to obtain at least one new statement;
replacing the select statement with the at least one new statement and storing the code segment including the at least one new statement in a storage.

2. The method of claim 1, wherein the first transformation comprises:
determining a third compile-time value (Z) equal to C−D and wherein the at least one new statement corresponds to: ((~x & A) shift_op shift_count)+D, wherein shift_op corresponds to a shift operation and shift_count corresponds to a number of bits of the shift operation; or
determining the third compile-time value (Z) equal to C−D and wherein the at least one new statement corresponds to: ((x & A) shift_op shift_count)+D, wherein shift_op corresponds to a shift operation and shift_count corresponds to a number of bits of the shift operation.

3. The method of claim 2, wherein the shift operation is a shift left if Z is greater than A, otherwise the shift operation is a shift right operation, and wherein the shift_count corresponds to an absolute value of (log2(Z)−log2(A)).

4. The method of claim 1, wherein the second transformation is to generate the at least one new statement corresponding to:
(X or Y) shift2_op ((x & A) shift1_op shift1_count))+(C−X), wherein shift1_op corresponds to a shift operation, shift1_count corresponds to a number of bits of the shift operation, and shift2_op corresponds to a shift left operation.

5. An article comprising a non-transitory machine-accessible storage medium including instructions that when executed cause a system to:

receive a select statement of a code segment corresponding to ((x & A) cond B) ? C : D;

determine whether a plurality of compile-time constants are present in the select statement and a selected one of the plurality of compile-time constants is a single-bit value, and whether a pair of relational expressions including a value present in the select statement can be predetermined, determine whether the select statement can be transformed if A is a single bit constant, x is an integer, and C–D is a power of two, or C–D is a string of logical one values and a first compile-time value (Y) is equal to a least significant bit of C–D and a second compile-time value (X) is equal to C–D+Y, and that $\log_2$ (X)–$\log_2$ (Y) is a power of two and the pair of relational expressions corresponding to (0 cond B) and (A cond B) can be predetermined, and otherwise determine that the select statement cannot be transformed;

if the select statement can be transformed, select a first transformation or a second transformation based on compile-time evaluated values of at least some of the plurality of compile-time constants of the select statement;

perform the selected transformation to obtain at least one new statement;

replace the select statement with the at least one new statement and store the code segment including the at least one new statement in a storage.

6. The article of claim 5, further comprising instructions that when executed enable the system to determine a third compile-time value (Z) equal to C–D and wherein the at least one new statement corresponds to: ((~x & A) shift_op shift_count)+D, wherein shift_op corresponds to a shift operation and shift_count corresponds to a number of bits of the shift operation, and wherein the shift operation is a shift left if Z is greater than A, otherwise the shift operation is a shift right operation, and wherein the shift_count corresponds to an absolute value of (log 2(Z)–log 2(A)).

7. The article of claim 5, further comprising instructions that when executed enable the system to determine a third compile-time value (Z) equal to C–D and wherein the at least one new statement corresponds to: ((x & A) shift_op shift_count)+D, wherein shift_op corresponds to a shift operation and shift_count corresponds to a number of bits of the shift operation, and wherein the shift operation is a shift left if Z is greater than A, otherwise the shift operation is a shift right operation, and wherein the shift_count corresponds to an absolute value of (log 2(Z)–log 2(A)).

8. The article of claim 5, wherein the second transformation is to generate the at least one new statement corresponding to: (X or Y) shift2_op ((x & A) shift1_op shift1_count))+ (C–X), wherein shift1_op corresponds to a shift operation, shift1_count corresponds to a number of bits of the shift operation, and shift2_op corresponds to a shift left operation.

9. A system comprising:

a processor to execute instructions;

a memory to store instructions that enable the system to receive a select statement corresponding to ((x & A) cond B) ? C : D of a code segment in a compiler, determine whether a plurality of compile-time constants are present in the select statement, a selected one of the plurality of compile-time constants is a single-bit value, and whether a pair of relational expressions including a value present in the select statement can be predetermined, determine that the select statement can be transformed if A is a single bit constant, x is an integer, and C–D is a power of two, or C–D is a string of logical one values and a first compile-time value (Y) is equal to a least significant bit of C–D and a second compile-time value (X) is equal to C–D+Y, and $\log_2$ (X)–$\log_2$ (Y) is a power of two, and otherwise determine that the select statement cannot be transformed and if the select statement can be transformed, select a first transformation or a second transformation based on compile-time evaluated values of at least some of the plurality of compile-time constants of the select statement, perform the selected transformation to obtain at least one new statement, and replace the select statement with the at least one new statement and store the code segment including the at least one new statement in a storage.

10. The system of claim 9, wherein the memory further includes instructions to determine a third compile-time value (Z) equal to C–D and wherein the at least one new statement corresponds to: ((~x & A) shift_op shift_count)+D, wherein shift_op corresponds to a shift operation and shift_count corresponds to a number of bits of the shift operation, and wherein the shift operation is a shift left if Z is greater than A, otherwise the shift operation is a shift right operation, and wherein the shift_count corresponds to an absolute value of (log 2(Z)–log 2(A)).

11. The system of claim 9, wherein the memory further includes instructions to determine a third compile-time value (Z) equal to C–D and wherein the at least one new statement corresponds to: ((x & A) shift_op shift_count)+D, wherein shift_op corresponds to a shift operation and shift_count corresponds to a number of bits of the shift operation, and wherein the shift operation is a shift left if Z is greater than A, otherwise the shift operation is a shift right operation, and wherein the shift_count corresponds to an absolute value of (log 2(Z)–log 2(A)).

12. The system of claim 9, wherein the second transformation is to generate the at least one new statement corresponding to: (X or Y) shift2_op ((x & A) shift1_op shift1_count))+ (C–X), wherein shift1_op corresponds to a shift operation, shift1_count corresponds to a number of bits of the shift operation, and shift2_op corresponds to a shift left operation.

* * * * *